United States Patent
Abraham et al.

(10) Patent No.: US 10,053,593 B2
(45) Date of Patent: Aug. 21, 2018

(54) COATING COMPOSITION COMPRISING A FATTY-ACID STARCH ESTER

(71) Applicant: Cargill, Incorporated, Wayzata, MN (US)

(72) Inventors: Timothy W. Abraham, Minnetonka, MN (US); Jonas Hartman, Espoo (FI); Dogan Sahin Sivasligil, Overijse (BE); Riku Talja, Vantaa (FI); Sauli Vuoti, Vantaa (FI)

(73) Assignee: CARGILL INCORPORATED, Wayzata, MN (US)

(*) Notice: Subject to any disclaimer, the term of this patent is extended or adjusted under 35 U.S.C. 154(b) by 0 days.

(21) Appl. No.: 15/301,809

(22) PCT Filed: Mar. 31, 2015

(86) PCT No.: PCT/US2015/023472
§ 371 (c)(1),
(2) Date: Oct. 4, 2016

(87) PCT Pub. No.: WO2015/153542
PCT Pub. Date: Oct. 8, 2015

(65) Prior Publication Data
US 2017/0174925 A1    Jun. 22, 2017

Related U.S. Application Data

(60) Provisional application No. 61/975,119, filed on Apr. 4, 2014.

(51) Int. Cl.
| | | |
|---|---|---|
| *C09D 103/06* | (2006.01) |
| *C08B 31/04* | (2006.01) |
| *C08L 3/06* | (2006.01) |
| *D21H 19/82* | (2006.01) |
| *C09D 7/63* | (2018.01) |
| *C08K 5/11* | (2006.01) |

(52) U.S. Cl.
CPC ............ *C09D 103/06* (2013.01); *C08B 31/04* (2013.01); *C08L 3/06* (2013.01); *C09D 7/63* (2018.01); *D21H 19/82* (2013.01); *C08K 5/11* (2013.01)

(58) Field of Classification Search
CPC .... C09D 103/06; C09D 7/1233; C08B 31/04; C08L 3/06; D21H 19/82; C08K 5/11
USPC ......................................................... 428/533
See application file for complete search history.

(56) References Cited

U.S. PATENT DOCUMENTS 6,001,473 A * 12/1999 Atkinson ............. C09D 103/06
427/208.4

FOREIGN PATENT DOCUMENTS

| EP | 0 486 092 A1 | 5/1992 |
| EP | 0486092 | * 5/1992 |
| EP | 2 537 865 A1 | 12/2012 |
| EP | 2537865 | * 12/2012 |
| JP | 2006/233160 | * 9/2006 |
| JP | 2006 233160 A | 9/2006 |
| WO | 94/22919 A1 | 10/1994 |
| WO | WO94/22919 | * 10/1994 |
| WO | 2013/021099 A1 | 2/2013 |

OTHER PUBLICATIONS

Sunsanee Udomrati et al., "Enzymatic esterification of tapioca maltodextrin fatty acid ester" Carbohydrate Polymers, vol. 99, Jan. 1, 2014 (Jan. 1, 2014) pp. 379-384 XP055194443.

* cited by examiner

*Primary Examiner* — Leszek Kiliman

(57) ABSTRACT

A starch-based release coating composition and methods of making the same.

15 Claims, No Drawings

COATING COMPOSITION COMPRISING A FATTY-ACID STARCH ESTER

CROSS REFERENCE TO RELATED APPLICATIONS

This application is a national phase application of PCT/US2015/023472, filed 31 Mar. 2015, which claims the benefit of U.S. Provisional Application No. 61/975,119 filed 4 Apr. 2014, both of which are hereby incorporated by reference in their entirety.

FIELD

The present invention relates to coating compositions having release properties (also known as release coatings). In particular, it relates to release coatings which are free or substantially free of silicone compounds.

BACKGROUND

Release coatings are typically defined as compositions which control or eliminate the adhesion between two surfaces, in particular between the surface of a first substrate onto which the release coating is applied (the backing material) and the surface of a second substrate (the adhesive material) which is coated with adhesive. Although when brought into contact, the backing material and adhesive material may be temporarily bound together, the release coating will allow them to be easily separated again, e.g. simply by manual peeling. In addition to these release properties, release coatings should also have good cohesive strength, film-forming properties, good adhesion with their substrate (i.e. with the substrate onto which they are coated), and, when brought into contact with an adhesive material, no significant contamination or component migration into the adhesive coating.

Silicone compounds, such as organosiloxanes, are well known for their use in the production of release coatings. Other types of release agents which have been used include synthetic polymers such as polyolefins and fluorocarbons, long chain alkyl derivatives such as fatty ester synthetic waxes and waxes such as petroleum, vegetable and animal waxes. Whilst all of these materials, but particularly the silicone compounds, have been shown to have suitable release characteristics for various applications, they are not useful when trying to produce paper products which can be repulped and/or recyclable. What's more, synthetic polymers tend to be prohibitively expensive. Silicones, for instance, must be cross-linked (or "cured") to give them suitable film-forming properties and to reduce component migration. Cross-linking of silicones is typically catalysed by platinum which is both costly and toxic, making its use undesirable. As such there was a need in the industry to develop alternatives to these petrochemical-derived compounds.

Starch and starch derivatives have been used for some time as "green" alternatives to synthetic compounds in the production of traditional coating products. They have been shown to be able to provide, amongst other things, good printability, strength and even certain water resistance properties. EP1072658B1 discloses the use of starch esters having an ester component of 2 to 8 carbon atoms and a DS of from 1.0 to 2.2 in release coatings and moisture vapor barrier coatings. Unfortunately, however, such starch esters are still prohibitively expensive to produce because of their high levels of modification. They also require the use of synthetic reactants having C2 to C8 carbon chains, such as propionic acid and butanoic acid. As such, coatings produced according to EP1072658B1 will not be entirely bio-based or sustainable.

There is therefore a clear need in the industry for improved bio-based release coatings suitable for use in the production of repulpable, recyclable paper products.

SUMMARY

According to one aspect of the present disclosure, there is provided a release coating composition comprising: a starch ester having a degree of substitution (DS) of between 0.05 and 3, wherein the ester groups of the starch ester comprise fatty acids having a carbon chain length of at least 8 carbon atoms. The composition may further comprise water and/or a plasticizer. It may further comprise a cross-linking agent.

According to another aspect of the present disclosure, there is provided a method of producing a release coating composition comprising: providing a starch ester having a degree of substitution (DS) of between 0.05 and 3, wherein the ester groups of the starch ester comprise fatty acids having a carbon chain length of at least 8 carbon atoms; and mixing said starch ester with water to form an aqueous composition.

According to another aspect of the present disclosure, there is provided a method of producing a release coating composition comprising: providing a starch ester having a degree of substitution (DS) of between 0.05 and 3, wherein the ester groups of the starch ester comprise fatty acids having a carbon chain length of at least 8 carbon atoms; and mixing said starch ester with a plasticizer to form a dry melt composition.

According to a further aspect of the present disclosure, there is provided a paper product coated with a composition as defined above or obtainable by a method described above.

According to an additional aspect of the present disclosure, there is provided a process for producing a paper product having release properties comprising coating the paper product on at least one surface with a composition as described above.

According to another aspect of the present disclosure, there is provided the use of a starch ester for the production of a release coating composition wherein the starch ester has a degree of substitution (DS) of between 0.05 and 3, and wherein the ester groups of the starch ester comprise fatty acids having a carbon chain length of at least 8 carbon atoms.

DETAILED DESCRIPTION

As defined above, a release coating composition (also referred to herein as "coating composition" or "release coating" for short) is a composition which is capable of controlling or eliminating the adhesion between two surfaces, in particular between the surface of a first substrate onto which the release coating is applied (the backing material) and the surface of a second substrate (the adhesive material) which is coated with an adhesive. Although when brought into contact, the backing material and the adhesive material may be temporarily bound together, the release coating will allow them to be easily separated, e.g. by simple manual peeling.

The present invention provides a release coating composition comprising a polysaccharide ester having a degree of substitution of 0.05 to 3, wherein its ester groups comprise fatty acids having a carbon chain of at least 8 carbon atoms.

Polysaccharide Esters

The term "polysaccharide ester" as used herein may refer to esters of any polysaccharides, including, by way of example only, starch esters, cellulose esters and hemicellulose esters. Preferably, the term will refer to starch esters.

Starch esters may be prepared from a native starch, or a starch derivative, of any origin. By way of illustration only, they may be prepared from potato starch, maize starch, waxy maize starch, wheat starch, rice starch, tapioca starch, pea starch, sorghum starch, sago starch, and any derivatives or combinations thereof.

The term "starch derivative" as used herein refers to starch materials which have been modified or degraded through chemical, mechanical, enzymatic and/or heat treatment. For example, the starch materials may be oxidised, thinned, dextrinised, and/or cross-linked. The starch materials may also be reacted with cationic, anionic, amphoteric, and/or non-ionic agents. The starch materials may be granular or non-granular. By "non-granular" is meant any starch or starch derivative that has had its native granular structure disrupted or removed. This can be achieved, for example, by jet cooking, drum drying, spray drying, extrusion, or dextrinisation.

The starch ester of the present invention will have a degree of substitution of 0.05 to 3. The term "degree of substitution" (DS) as used herein indicates the average number of sites per anhydroglucose unit of the starch molecule (or starch derivative molecule) on which there are substituent groups. The DS of the starch ester will preferably be between 0.1 and 2, more preferably between 0.4 and 1, more preferably between 0.5 and 0.9.

The ester groups of the starch esters of the present invention will comprise—or preferably consist of—fatty acids having a carbon chain of at least 8 carbon atoms. In one aspect, the ester groups will comprise fatty acids having a carbon chain of at least 9 carbons, preferably at least 10 carbons, more preferably at least 12 carbons, or more preferably at least 14 carbons. For example, the ester groups may comprise C16 fatty acids. Preferably, the ester groups will not comprise fatty acids having a carbon chain of less than 8. More preferably they will not comprise fatty acids having a carbon chain of less than 9. The fatty acids will preferably be vegetable oil-sourced fatty acids. For example, the ester groups may comprise palmitic acid, lauric acid, oleic acid stearic acid, and mixtures thereof.

Advantageously, the starch or starch derivative used in the preparation of the starch esters of the present invention will be a thinned starch. Preferably, the starch or starch derivative will have a dextrose equivalent of 1 or more. The term "dextrose equivalent" (DE) refers to the number of glucose reducing ends present in the starch or starch derivative, relative to dextrose, expressed as a percentage on a dry basis. Thus, the starch or starch derivative may have a DE of 1-50, preferably of 1-25, more preferably of 1-20. For example, the DE may be in the range of 15-20. Preferably, the starch esters will be prepared from maltodextrins. The maltodextrins may, for instance, have a DE of 15.5 to 18.5.

As will be appreciated by a person skilled in the art, thinned starches—or starch derivatives having a DE of 1 or more—may be further modified. This further modification may alter the DE of the molecule. Hydrogenation, oxidation and indeed esterification may all, for instance, reduce the DE of the starch derivative. Nonetheless, it will remain suitable for use in accordance with the present invention. Thus, a starch of use in the present invention may be thinned to a DE or 1 or more but may then be further modified such that the final starch derivative has a DE of less than 1.

In addition to the starch esters, the coating composition of the present invention may comprise one or more further ingredients. By way of illustration only, these may include a plasticiser, a cross-linking agent, water, a filler, an antioxidant, a stabilizer, an anti-foaming agent, a surfactant, a wax, a dye, a colorant, a biocide, and a rheology modifier. Preferably, it will include at least a plasticizer.

Plasticisers

A plasticiser, as used in the present invention, will preferably be a non-volatile organic material which is compatible with the starch ester of the coating composition. Advantageously, it will be hydrophobic (absorbing low levels of moisture at high humidity). The plasticiser will preferably be used in an amount sufficient to lower the glass transition temperature (Tg) of the starch ester to about 75 to 200° C., preferably 80 to 135° C. For example, it may be used in an amount from 0 to 50%, preferably from 0.2-40%, more preferably from 5-35%, or more preferably from 10-30%, or more preferably from 15-20% by weight, based on the total weight of starch ester and plasticiser in the composition. It will typically have a molecular weight of less than about 10,000 Daltons. Useful plasticisers may, in particular, be selected from organic acid esters, organic acid salts, soaps and mixtures thereof. Examples of suitable plasticisers include glycerol triacetate, triethyl citrate, potassium palmitate, potassium oleate and mixtures thereof.

Cross-Linking Agents

The composition of the invention may comprise one or more cross-linking agents. Cross-linking agents may be used, for instance, to enhance the cohesive strength of the composition, and/or to reduce component migration when the composition is in use. Examples of suitable cross-linking agents include ammonium zirconium carbonate (AZC), aldehydes (e.g., glyoxal), gluteraldehydes, polyanhydrides, and mixtures thereof.

Form of the Composition

The term "release coating composition" may be used to refer to dry, semi-dry or aqueous compositions. The dry or semi-dry compositions may be used as such, optionally combined with a plasticizer, in the form of a melt (i.e. a composition which is applied to the surface of a substrate and then formed into a film though the application of heat—also referred to as "dry melt compositions" or "hot melt compositions"), or they may be used in the preparation of aqueous compositions. Aqueous compositions will comprise at least the starch ester and water. The starch ester may be suspended or solubilised in the water, or the starch ester and water may form an emulsion.

If provided in the form of an aqueous composition, the composition of the invention will preferably comprise, by weight based on the total weight of the composition:

5-80%, preferably 10-50%, more preferably 15-35% starch esters 0-40%, preferably 0.2-35%, more preferably 5-30% plasticiser 0-10%, preferably 0.1-5%, more preferably 0.5-3% cross-linking agent, and 20-90%, preferably 30-80%, more preferably 40-70% water.

Alternatively, if provided in the form of a dry melt composition, the composition of the invention will preferably comprise, by weight based on the total weight of the composition:

5-90%, preferably 10-70%, more preferably 15-50% starch esters 10-40%, preferably 15-35%, more preferably 20-30% plasticiser 0-10%, preferably 0.1-5%, more preferably 0.5-3% cross-linking agent.

Sustainable and/or Bio-Based Materials

One of the advantages of the composition of the present invention is that it need not include any of the silicon compounds typically required in the manufacture of traditional release coatings and, indeed, will preferably be substantially free of these and other petrochemical-derived or petrochemical-based compounds. Thus, the composition may advantageously be produced from only sustainable and/or bio-based materials. The term "bio-based materials" as used herein refers to materials which are derived from vegetable, animal, or microbial sources. Preferably, they will be derived from vegetable sources. The term "sustainable" means that the materials used to produce the compositions of the invention are generated from resources that are sustainable over an extended period of time (i.e. from resources that are not at risk of depletion). Advantageously, when used to coat paper products, compositions of the present invention will not prevent them from being recyclable and/or repulpable.

Methods of Preparing Release Coating Compositions

The present invention provides a method of producing a release coating composition comprising: (a) providing a starch ester having a degree of substitution of 0.05 to 3, wherein its ester groups are fatty acids having a carbon chain of at least 8 carbon atoms; and (b) mixing said starch ester with water to form an aqueous composition. Alternatively, the method may comprise (a) providing a starch ester having a degree of substitution of 0.05 to 3, wherein its ester groups are fatty acids having a carbon chain of at least 8 carbon atoms; and (b) mixing said starch ester with a plasticizer to form a dry melt composition. Terms used herein to describe the method of the present invention, if already defined above, will take on their previously defined meaning.

Step (a) will preferably include the step of reacting a starch or starch derivative with a reactant, preferably a bio-based reactant, more preferably a vegetable-based reactant. The reactant may be any compound or composition capable of donating one or more fatty acids having a carbon chain of at least 8 carbon atoms. Thus, the reactant may comprise fatty acids, fatty acid esters, alkyl fatty acid esters, fatty acid chlorides, fatty acid anhydrides, and mixtures of two or more thereof. Alternatively, the reactant may comprise mono-, di- or triglycerides. For example, the reactant may comprise—or consist of—a bio-based oil, preferably a vegetable oil. Vegetable oils suitable for use as reactants in accordance with the present invention may include, by way of illustration only, palm oil, coconut oil, soy oil, sunflower oil, canola oil, linseed oil, and mixtures thereof.

The fatty acids (or fatty acid chains) used to form the starch esters of the present invention will preferably be saturated, meaning that they will preferably not have any double or triple bonds (and will not contain any carbon rings) along their carbon backbones. The carbon backbones (or "carbon chains") will comprise at least 8 carbon atoms. Preferably, they will comprise at least 10 carbons, more preferably at least 12 carbons, more preferably at least 14 carbons, more preferably at least 16 carbons. For example, suitable fatty acids may include palmitic acid (C16), lauric acid (C12), oleic acid (C18), and mixtures thereof.

Starch esterification may be performed using any technique known in the art. A skilled person will readily be able to determine the specific method to be used depending, for example, on the type of reactant and starch material (starch or starch derivative) under consideration. Thus, for instance, if a catalyst is employed, it will preferably be selected amongst bio-based catalysts (such as bio-based acids or alkalis).

In one aspect of the invention, the starch esters may be prepared by mixing a starch or starch derivative, such as maltodextrin, with anhydrous dimethylformaldehyde and dry triethylamine at room temperature or above (e.g. at about 45° C.). A fatty acid chloride (such as palmitoyl chloride) may then be added (e.g. dropwise) with the resulting mixture being stirred at room temperature until sufficient starch ester is formed (e.g. about 6 hours). The starch ester may then be precipitated in ethanol. Optionally, the starch ester may also be filtered, washed, and/or freeze-dried.

The starch esters, once formed, may be further modified. Thus, for instance, if it is desired to use a thinned starch, thinning may be performed either before or after esterification. Similarly, cross-linking may be performed both before and after esterification. Alternatively, these further modifications may be performed concurrently (or simultaneously) with the esterification step.

Step (b) may comprise mixing the starch ester with water to form a dispersion, a solution or an emulsion. One or more optional ingredients (including a plasticiser or a cross-linking agent) may be added with, before, or after the water. By way of illustration, an aqueous composition may be formed by mixing the starch ester with a plasticiser (such as triethyl citrate) and, optionally, a cross-linking agent (such as AZC). Water may then be added and the mixture heated (e.g. to about 75° C.) to form the release coating composition.

Alternatively, step (b) may comprise mixing the starch ester with a plasticizer to form a melt. Again, any additional ingredients (such as a cross-linking agent) may be added with, before, or after the plasticiser. By way of illustration, a dry melt composition may be formed by mixing the starch ester with a plasticiser (such as triethyl citrate). The composition may then be heated (e.g. to about 175° C.) to form a melt. Optionally, tetrahydrofuran may be added to the cooled melt to finalise the composition.

Depending on the type of starch esters being used (e.g. on their DS) and the desired end application, a skilled person will be able to determine which form of composition is most suitable and will give the best results.

Advantageously, it has been found that compositions according to the present invention are well suited for use as release coating compositions. They have suitable release properties, good cohesive strength, good adhesion with their substrate (i.e. the backing material) and, when brought into contact with an adhesive-coated material (i.e. the adhesive material), reduced or limited contamination or component migration into the adhesive. In particular, the compositions of the present invention will have a total free surface energy, measured according to Method 1, below, of 50 mN/m or less, preferably 40 mN/m or less, more preferably 35 mN/m or less, more preferably 30 mN/m or less, more preferably between 20 and 30 mN/m.

They will also preferably have a peeling force, measured according to Method 2, below, of 0.15 N/mm or less, preferably 0.1 N/mm or less, more preferably 0.05 N/mm or less, more preferably 0.03 N/mm or less, more preferably 0.01 N/mm or less, more preferably 0.005 N/mm or less, more preferably 0.003 N/mm or less, more preferably 0.001 N/mm or less.

The coating composition of the present invention may be used as a release coating for any number of different substrates. It will be particularly well suited, however, for coating paper products. The term "paper products" as used herein generally refers to any sheet material produced from cellulosic pulp and includes, by way of example only, sheet paper, glassine paper, paper board, cardboard and card stock. The paper products may be pre-coated or treated using any method known in the art (e.g. calendering) prior to application of the release coating of the present invention.

Thus, according to another aspect of the present invention, there is provided a substrate, preferably a paper product, coated with a coating composition as described above—and a process for producing it. At least one surface of the substrate will be coated. The term "coated" as used herein refers to the fact that a continuous and substantially even layer (or "film") of the coating composition is applied to the surface of the substrate. The coating composition may be applied using any means known in the art. Conventional coating techniques include, for example, brushing, spreading, dipping, rolling, and wire or knife coating. The technique will be selected depending on the substrate to be coated. The composition can be applied to the substrate at room temperature or above, preferably at about 50 to 75° C. Alternatively—or in addition—application of the coating composition may be followed by a heating or drying step (e.g. air drying, oven drying, hot air treatment). Calendering and/or other finishing techniques may also be used if needed.

Advantageously, the coating composition will be applied in an amount of 0.1 to 15 g/m$^2$, preferably of 0.5 to 10 g/m$^2$, more preferably 1 to 5 g/m$^2$.

Certain embodiments of the present invention will now be described by way of the following, non-limiting examples.

EXAMPLES

Example 1—Preparation of Maltodextrin Palmitates

In all cases, maltodextrin was dried under vacuum to a moisture level of below 1% before use.

1.1—Preparation of Sample A

Dry Maltodextrin C*Dry 01912 (10 g, 0.06 mol) as dry weight was mixed thoroughly with anhydrous dimethylformamide (100 ml) and dry triethylamine (50 mL) at room temperature. Shortly after, 45.0 mL of palmitoyl chloride was added dropwise to the mixture, and the mixture was stirred at ambient temperature for 6 hours. The palmitic acid ester maltodextrin was then precipitated in ethanol containing 5% of water, filtered and subsequently washed with ethanol until no free palmitic acid signal was presented according to IR. The product was then freeze-dried.

1.2—Preparation of Sample B

Dry Maltodextrin C*Dry 01912 (10 g, 0.06 mol) as dry weight was mixed thoroughly with anhydrous dimethylformamide (100 ml) and dry triethylamine (50 mL) at 45° C. Shortly after, 30.0 mL of palmitoyl chloride was added dropwise to the mixture, and the mixture was stirred at ambient temperature for 6 hours. The palmitic acid ester maltodextrin was then precipitated in ethanol containing 5% of water, filtered and subsequently washed with ethanol until no free palmitic acid signal was presented according to IR. The product was then freeze-dried.

1.3—Preparation of Sample C

Dry Maltodextrin C*Dry 01912 (10 g, 0.06 mol) as dry weight was mixed thoroughly with anhydrous dimethylformamide (100 ml) and dry triethylamine (50 mL) at 60° C. Shortly after, 30.0 mL of palmitoyl chloride was added dropwise to the mixture, and the mixture was stirred at ambient temperature for 6 hours. The palmitic acid ester maltodextrin was then precipitated in ethanol containing 5% of water, filtered and subsequently washed with ethanol until no free palmitic acid signal was presented according to IR. The product was then freeze-dried.

1.4—Preparation of Sample D

Dry Maltodextrin C*Dry 01912 (10 g, 0.06 mol) as dry weight was mixed thoroughly with anhydrous dimethylformamide (100 ml) and dry triethylamine (20 mL) at room temperature. Shortly after, 10 mL of palmitoyl chloride was added dropwise to the mixture, and the mixture was stirred at ambient temperature for 6 hours. The palmitic acid ester maltodextrin was then precipitated in ethanol containing 5% of water, filtered and subsequently washed with ethanol until no free palmitic acid signal was presented according to IR. The product was then freeze-dried.

1.5—Preparation of Sample E

Dry Maltodextrin C*Dry 01912 (10 g, 0.06 mol) as dry weight was mixed thoroughly with anhydrous dimethylformamide (100 ml) and dry triethylamine (50 mL) at room temperature. Shortly after, 3.0 mL of palmitoyl chloride was added dropwise to the mixture, and the mixture was stirred at ambient temperature for 6 hours. The palmitic acid ester maltodextrin was then precipitated in ethanol containing 5% of water, filtered and subsequently washed with ethanol until no free palmitic acid signal was presented according to IR. The product was then freeze-dried.

The degree of substitution (DS) of each sample was measured using the Wurzburg method for titrimetric analysis (Wurzburg, 1964). The results are presented in Table 1.

TABLE 1

| Specific reaction conditions for each sample | | | |
|---|---|---|---|
| Sample | T (° C.) | Reagent* (mol eq.) | DS |
| A | 25 | 2.25 | 0.8 |
| B | 45 | 1.5 | 0.7 |
| C | 60 | 1.5 | 0.8 |
| D | 25 | 0.5 | 0.2 |
| E | 25 | 0.15 | 0.1 |

*Palmitoyl chloride

Example 2—Measurement of Surface Energy

Coating colours (A-40TEC, B-40TEC and C-40TEC) were prepared by mixing 2 g of sample A, B or C with 0.8 g of triethylcitrate (TEC) as a plasticiser, followed by heating the mixture up to 175° C. prior to melt formation. 4.5 ml of tetrahydrofuran (THF) was added on cooled melt to finalise the coating colour.

A further coating colour (C w/o TEC) was prepared from sample C, as above, but without the plasticiser.

Coating colours (D-40TEC and E-40TEC) were prepared by mixing 2 g of sample D or E with 0.8 g of triethylcitrate (TEC) as a plasticiser. 8 g of water was added, followed by heating the suspension up to 75° C. for 30 min to form the coating colours.

Further coating colours were prepared with samples D and E (D-40TEC-5AZC and E-40TEC-5AZC), this time by mixing 2 g of sample D or E with 0.8 g of triethylcitrate (TEC) as a plasticiser and 0.1 g of ammonium zirconium carbonate (AZC) as a cross-linker. 8 g of water was added followed by heating the suspension up to 75° C. for 30 min to form the coating colours.

Coating layers were applied on a base paper (Delfort Tersil Constant White SZ, 60 gsm uncoated base paper) by using a laboratory coater (the Erichsen Coatmaster 509 MC). Draw-down bar (10-40 μm) was used to spread the coating colour on the base paper at a speed of 24 mm/s. The draw-down bar was pre-heated to 105° C. prior to applying the coating colours based on samples A, B and C. The other coating colours, and a commercial reference, were applied by using draw-down bar tempered at room temperature. The coating layers were dried at room temperature except the coating colours containing the cross-linker which were dried at 105° C. for maximum 4 min.

Method 1—Free Surface Energy:

Contact angles of water, di-iodomethane and formamide droplets were determined with a CAM 200 (KSV Instruments, Finland). The droplet of the liquid was dropped on the sample surface. During the first 2 seconds, a photograph was taken every 0.04 sec and for the remaining 10 sec every second. The contact angle was determined from the photograph at triple-phase line, between the tangents at the two surfaces (liquid and solid). The contact angle was taken at the time of 1 sec. The contact angle data obtained was used to calculate surface free energies of the release coatings and the reference materials. Water and formamide are polar solvents whereas di-iodomethane is a non-polar solvent. The surface free energy and its polar and dispersive components were calculated according to the extended Fowkes method (as described in Zenkiewicz, M. "Methods for the calculation of surface free energy of solids" Journal of Achievements in Materials and Manufacturing Engineering. 24.1 (2007): 137-145). The results are presented in Table 2.

TABLE 2

| | Free surface energy (mN/m) | | | Contact angle (°) of |
| --- | --- | --- | --- | --- |
| | Dispersive | Polar | Total | water |
| Evonik (Silikopur 8080) | 20.59 | 2.46 | 23.05 | 93.9 |
| Sample A-40TEC (DS 0.8) | 25.08 | 0.10 | 25.18 | 105.4 |
| Sample E-40TEC (DS 0.1) | 25.76 | 23.22 | 48.98 | 45.7 |

Example 3—Peeling Test

In a peel test, the force required to peel the release liner from the label was recorded by the tensile testing machine (Instron universal testing machine, 4505) using a modified standard (ASTM D3330)—Method 2. Prior to testing, the label material (Raflacoat Plus with Acrylic adhesive RP 51) width of 10 mm was attached on the release liner of the interest by slowly rolling over the label twice with a constant roll (2038 g). A dwell time of a less than 5 minutes was used prior to starting the peel test. The tests were carried out in constant room conditions (23° C. and RH 50%) for a T-type specimen. The ends of the test label and release liner were left unbound and they were clamped in the cross-head grips of the tensile testing machine. A load of a constant cross-head speed (300 mm min−1) was applied and the peel force was recorded. An average load was calculated from the load extension curves between the extensions of 100 to 200 mm. The peeling force was calculated by dividing load value with width of the test label (10 mm). The release liner and the adhesive surface were inspected visually after the peel test looking at visual coating transfer, tape tackiness and retack on the release coating. The results are set out in Table 3.

TABLE 3

Peeling forces and coat weights for release coatings

| | Coat weight (g/m$^2$) | Peeling force (N/mm) | Coating transfer | Tape tackiness | Retack on coating |
| --- | --- | --- | --- | --- | --- |
| Raflatack's release paper (1) (silicone-based) | — | 0.0030 ± 0.0005 | No | Yes | Yes |
| Evonik (2) (silicone-based) | 2.6 | 0.0389 ± 0.0104 | No | Yes | Yes |
| Sample A-40TEC | 4.2 | 0.0398 ± 0.0108 | Yes | Mild | Mild |
| Sample B-40TEC | 6.6 | 0.0209 ± 0.0030 | n/a | n/a | n/a |
| Sample C w/o TEC | 5.6 | 0.0207 ± 0.0016 | Yes/No | Yes | Mild |
| Sample C-40TEC | 4.8 | 0.0349 ± 0.0100 | No | Yes | Yes |
| Sample C-40TEC | 8.7 | 0.0311 ± 0.0103 | No | Yes | Yes |
| Sample D-40TEC | 4.9 | 0.0528 ± 0.0038 | No | Yes | Yes |
| Sample D-40TEC-5AZC | 3.3 | 0.0691 ± 0.0094 | No | Yes | Yes |
| Sample E-40TEC | 4.5 | 0.0494 ± 0.0051 | No | Yes | Yes |
| Sample E-40TEC-5AZC | 5.7 | 0.0703 ± 0.0036 | No | Yes | Yes |

(1) PM Raflatac's label: Face material Raflacoat Plus, Backing: Honey Glassine 65; Adhesive RP 51 (acrylic-based)
(2) Silikopur 8080

The invention claimed is:

1. A release coating composition comprising: a starch ester having a degree of substitution (DS) of between 0.05 and 3, wherein the ester groups of the starch ester comprise a fatty acid having a carbon chain length of at least 9 carbon atoms.

2. A composition according to claim 1, wherein the fatty acid is a vegetable oil-sourced fatty acid.

3. A composition according to any one of the preceding claims, wherein the composition further comprises a plasticiser.

4. A composition according to any one of the preceding claims, wherein the composition further comprises water.

5. A composition according to any one of the preceding claims, wherein the composition further comprises a cross-linking agent.

6. A composition according to any one of the preceding claims, wherein the composition has a free surface energy of 50 mN/m or less when measured according to Method 1.

7. A composition according to any one of the preceding claims, wherein the composition has a peeling force of 0.15 mN/mm or less when measured according to Method 2.

8. A method of producing an aqueous release coating composition comprising:

providing a starch ester having a degree of substitution (DS) of between 0.05 and 3, wherein the ester groups of the starch ester comprise fatty acids having a carbon chain length of at least 9 carbon atoms; and mixing said starch ester with water.

9. A method according to claim 8, further comprising the step of adding a plasticizer.

10. A method of producing a dry melt release coating composition comprising:

providing a starch ester having a degree of substitution (DS) of between 0.05 and 3, wherein the ester groups of the starch ester comprise fatty acids having a carbon chain length of at least 9 carbon atoms; and mixing said starch ester with a plasticizer.

11. A method according to claim 8, wherein the starch ester is provided by reacting a starch or starch derivative with a bio-based reactant, preferably with an alkyl fatty acid ester or vegetable oil.

12. A method according to claim 8, wherein the starch derivative is a maltodextrin.

13. A release coating composition obtainable according to the method of claim 8.

14. A paper product coated with a composition according to claim 1.

15. Process for producing a paper product having release properties comprising coating the paper product on at least one surface with the composition of claim 1.

* * * * *